(12) United States Patent
Chang et al.

(10) Patent No.: US 9,411,453 B2
(45) Date of Patent: Aug. 9, 2016

(54) TOUCH-CONTROLLED DISPLAY PANEL AND TOUCH-CONTROLLED DISPLAY DEVICE

(71) Applicant: Shenzhen China Star Optoelectronics Technology Co., Ltd., Guangdong (CN)

(72) Inventors: Chun Kai Chang, Guangdong (CN); Yung-Lun Lin, Guangdong (CN); Jie Qiu, Guangdong (CN); Chengliang Ye, Guangdong (CN); Ruhai Fu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 70 days.

(21) Appl. No.: 14/373,637

(22) PCT Filed: Mar. 11, 2014

(86) PCT No.: PCT/CN2014/073190
§ 371 (c)(1),
(2) Date: Jul. 22, 2014

(87) PCT Pub. No.: WO2015/123898
PCT Pub. Date: Aug. 27, 2015

(65) Prior Publication Data
US 2015/0234510 A1  Aug. 20, 2015

(30) Foreign Application Priority Data
Feb. 20, 2014 (CN) .......................... 2014 1 0058424

(51) Int. Cl.
*G06F 3/041* (2006.01)
*G02F 1/1333* (2006.01)

(52) U.S. Cl.
CPC .......... *G06F 3/0412* (2013.01); *G02F 1/13338* (2013.01)

(58) Field of Classification Search
CPC ..... G06F 3/0412; G06F 3/0416; G06F 3/044; G02F 1/1333; G02F 1/13338
See application file for complete search history.

(56) References Cited

U.S. PATENT DOCUMENTS

| | | | |
|---|---|---|---|
| 2010/0193257 A1* | 8/2010 | Hotelling | G06F 3/0412 178/18.06 |
| 2010/0194697 A1* | 8/2010 | Hotelling | G06F 3/0412 345/173 |
| 2013/0257774 A1* | 10/2013 | Kim | G06F 3/0412 345/173 |
| 2013/0342479 A1* | 12/2013 | Pyo | G06F 3/044 345/173 |

* cited by examiner

*Primary Examiner* — Nalini Mummalaneni
*Assistant Examiner* — Ivelisse Martinez Quiles (57) ABSTRACT

The present invention provides a touch-controlled display panel, which comprises an array substrate, a color filter substrate, and a liquid crystal layer disposed between the array substrate and the color filter substrate. The array substrate comprises a scan line, a data line, a pixel electrode, a first touch-controlled driving line, and a touch-controlled sensing line. The present invention further provides a touch-controlled display device. The present invention integrates the common line with the touch-controlled driving line and the touch-controlled sensing line, thereby improving the efficiency in manufacturing the touch-controlled display panel and reducing the manufacture cost thereof.

16 Claims, 5 Drawing Sheets

TOUCH-CONTROLLED DISPLAY PANEL AND TOUCH-CONTROLLED DISPLAY DEVICE

RELATED APPLICATIONS

This application is a National Phase of PCT Patent Application No. PCT/CN2014/073190 having International filing date of Mar. 11, 2014, which claims the benefit of priority of Chinese Patent Application No. 201410058424.3 filed on Feb. 20, 2014. The contents of the above applications are all incorporated by reference as if fully set forth herein in their entirety.

BACKGROUND OF THE INVENTION

1. Field of the Invention

The present invention relates to a liquid crystal display technology, and more particularly, to a touch-controlled display panel and a touch-controlled display device.

2. Description of Prior Art

Most of touch-controlled screens of touch-controlled display panels currently are out-cell capacitive touchscreens. That is, a touchscreen and a display screen are separately manufactured and then are attached together. This conventional skill exists drawbacks including high manufacture cost, low light transmittance, thick module, and etc. With the development of technology, in-cell touchscreen technology gradually becomes a new favorite. In the in-cell technology, driving electrode lines and sensing electrode lines used to carry out a touch-controlled function are disposed on an inherent substrate of a display panel. In contrast to an out-cell touchscreen display device, a touch-controlled display device adopting the in-cell technology has various advantages such as small thickness, high performance, and low cost.

However, there is a need to proceed photolithography on a conventional display screen by using a photomask when disposing additional driving electrode lines and sensing electrode lines on a substrate of the display screen. The photolithography may affect other deposits (e.g., an electrode layer) on the existing substrate to a considerable degree. It also needs to fabricate a unique photomask for manufacturing the driving electrode lines and the sensing electrode line. Therefore, it is low in manufacture efficiency and high in manufacture cost for the in-cell touch-controlled display panel.

Therefore, there is a need to provide a touch-controlled display panel and a touch-controlled display device for solving above technical problems occurred in the existing technical skills.

SUMMARY OF THE INVENTION

The objective of the present invention is to provide a touch-controlled display panel and a touch-controlled display device with high manufacture efficiency and low manufacture cost, for solving the technical problems of low manufacture efficiency and high manufacture cost, raised in conventional touch-controlled display panels and touch-controlled display devices.

To solve above technical problems, the present invention provides following technical schemes.

The present invention provides a touch-controlled display panel, which comprises an array substrate, a color filter substrate, and a liquid crystal layer disposed between the array substrate and the color filter substrate, wherein the array substrate comprises:

a scan line disposed on a first metal layer, for transmitting a scan signal;

a data line disposed on a second metal layer, for transmitting a data signal;

a pixel electrode for receiving the data signal of the data line according to the scan signal of the scan line, the pixel electrode being connected to the data line and the scan line corresponding thereto via a thin-film transistor;

a first touch-controlled driving line disposed on the first metal layer and parallel to the scan line, for providing a common signal for the pixel electrode and a touch-controlled driving signal; and a touch-controlled sensing line disposed on the second metal layer and parallel to the data line, for receiving the common signal for the pixel electrode and a touch-controlled sensing signal.

In the touch-controlled display panel of the present invention, at least one first touch-controlled driving line forms a first touch-controlled driving region and at least one touch-controlled sensing line forms a touch-controlled sensing region.

In the touch-controlled display panel of the present invention, a lengthwise direction of the first touch-controlled driving region is perpendicular to that of the touch-controlled sensing region.

In the touch-controlled display panel of the present invention, the array substrate further comprises:

a first ground line disposed on the second metal layer and parallel to the data line, for providing the common signal for the pixel electrode and a ground signal; and a second ground line disposed on the first metal layer and parallel to the scan line, for providing the common signal for the pixel electrode and the ground signal;

wherein the first ground line is disposed between any two adjacent touch-controlled sensing regions, and the second ground line is disposed between any two adjacent first touch-controlled driving regions.

In the touch-controlled display panel of the present invention, the array substrate further comprises:

a second touch-controlled driving line disposed on the first metal layer and parallel to the data line, for providing the common signal for the pixel electrode and the touch-controlled driving signal, the second touch-controlled driving line being connected to the first touch-controlled driving line corresponding thereto; and a third touch-controlled driving line disposed on the second metal layer and parallel to the data line, for receiving the common signal for the pixel electrode and the touch-controlled sensing signal, the third touch-controlled driving line being connected to the second touch-controlled driving line corresponding thereto;

wherein the third touch-controlled driving line is connected to the corresponding second touch-controlled driving line located on the first metal layer, via a contact hole, and the second touch-controlled driving line and the third touch-controlled driving line have a one-to-one correspondence.

In the touch-controlled display panel of the present invention, at least one second touch-controlled driving line and the third touch-controlled driving line corresponding thereto form a second touch-controlled driving region, and at least one touch-controlled sensing line forms a touch-controlled sensing region.

In the touch-controlled display panel of the present invention, a lengthwise direction of the second touch-controlled driving region is parallel to that of the touch-controlled sensing region.

In the touch-controlled display panel of the present invention, the second touch-controlled driving region and the touch-controlled sensing region are arranged at intervals.

In the touch-controlled display panel of the present invention, the array substrate further comprises:

a first ground line disposed on the second metal layer and parallel to the data line, for providing the common signal for the pixel electrode and a ground signal;

wherein the first ground line is disposed between the touch-controlled sensing region and the second touch-controlled driving region adjacent thereto.

The present invention further provides a touch-controlled display device, comprising:

a backlight source; and a touch-controlled display panel comprising an array substrate, a color filter substrate, and a liquid crystal layer disposed between the array substrate and the color filter substrate;

wherein the array substrate comprises:

a scan line disposed on a first metal layer, for transmitting a scan signal;

a data line disposed on a second metal layer, for transmitting a data signal;

a pixel electrode for receiving the data signal of the data line according to the scan signal of the scan line, the pixel electrode being connected to the data line and the scan line corresponding thereto via a thin-film transistor;

a first touch-controlled driving line disposed on the first metal layer and parallel to the scan line, for providing a common signal for the pixel electrode and a touch-controlled driving signal; and a touch-controlled sensing line disposed on the second metal layer and parallel to the data line, for receiving the common signal for the pixel electrode and a touch-controlled sensing signal.

In the touch-controlled display device of the present invention, at least one first touch-controlled driving line forms a first touch-controlled driving region and at least one touch-controlled sensing line forms a touch-controlled sensing region.

In the touch-controlled display device of the present invention, a lengthwise direction of the first touch-controlled driving region is perpendicular to that of the touch-controlled sensing region.

In the touch-controlled display device of the present invention, the array substrate further comprises:

a first ground line disposed on the second metal layer and parallel to the data line, for providing the common signal for the pixel electrode and a ground signal; and a second ground line disposed on the first metal layer and parallel to the scan line, for providing the common signal for the pixel electrode and the ground signal;

wherein the first ground line is disposed between any two adjacent touch-controlled sensing regions, and the second ground line is disposed between any two adjacent first touch-controlled driving regions.

In the touch-controlled display device of the present invention, the array substrate further comprises:

a second touch-controlled driving line disposed on the first metal layer and parallel to the data line, for providing the common signal for the pixel electrode and the touch-controlled driving signal, the second touch-controlled driving line being connected to the first touch-controlled driving line corresponding thereto; and a third touch-controlled driving line disposed on the second metal layer and parallel to the data line, for receiving the common signal for the pixel electrode and the touch-controlled sensing signal, the third touch-controlled driving line being connected to the second touch-controlled driving line corresponding thereto;

wherein the third touch-controlled driving line is connected to the corresponding second touch-controlled driving line located on the first metal layer, via a contact hole, and the second touch-controlled driving line and the third touch-controlled driving line have a one-to-one correspondence.

In the touch-controlled display device of the present invention, at least one second touch-controlled driving line and the third touch-controlled driving line corresponding thereto form a second touch-controlled driving region, and at least one touch-controlled sensing line forms a touch-controlled sensing region.

In the touch-controlled display device of the present invention, a lengthwise direction of the second touch-controlled driving region is parallel to that of the touch-controlled sensing region.

In the touch-controlled display device of the present invention, the second touch-controlled driving region and the touch-controlled sensing region are arranged at intervals.

In the touch-controlled display device of the present invention, the array substrate further comprises:

a first ground line disposed on the second metal layer and parallel to the data line, for providing the common signal for the pixel electrode and a ground signal;

wherein the first ground line is disposed between the touch-controlled sensing region and the second touch-controlled driving region adjacent thereto.

In contrast to conventional touch-controlled display panels and the touch-controlled display devices, the touch-controlled display panel and the touch-controlled display device of the present invention integrate the common line with the touch-controlled driving line and the touch-controlled sensing line, thereby improving the efficiency in manufacturing the touch-controlled display panel and reducing the manufacture cost for the touch-controlled display panel. The present invention solves the technical problems of low manufacture efficiency and high manufacture cost, raised in conventional touch-controlled display panels and touch-controlled display devices.

To make above content of the present invention more easily understood, it will be described in details by using preferred embodiments in conjunction with the appending drawings.

DETAILED DESCRIPTION OF THE PREFERRED EMBODIMENTS

The following descriptions for the respective embodiments are specific embodiments capable of being implemented for illustrations of the present invention with referring to appended figures. In the descriptions of the present invention, spatially relative terms, such as "upper", "lower", "front", "back", "left", "right", "inner", "outer", "lateral", and the like, may be used herein for ease of description as illustrated in the figures. Therefore, it will be understood that the spatially relative terms are intended to illustrate for understanding the present invention, but not to limit the present invention.

In the appending drawings, units having similar structures are labeled by the same reference numbers.

Figure 1:
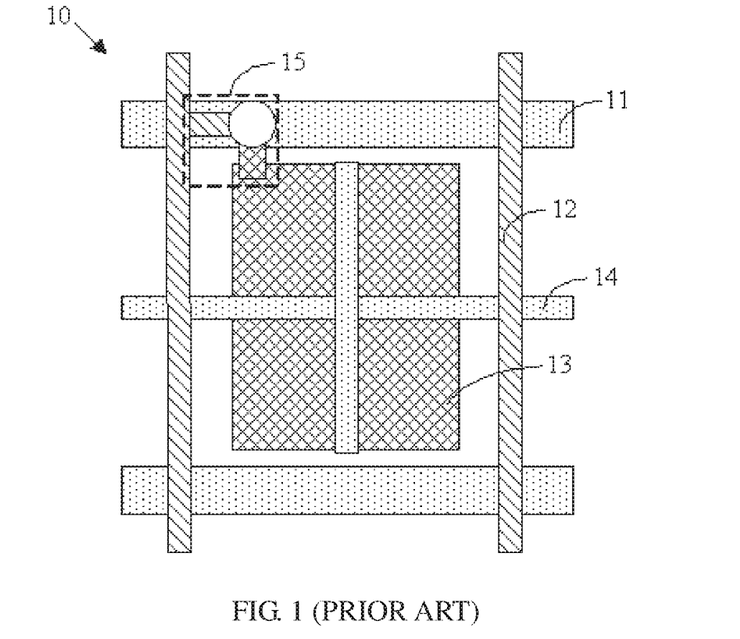
FIG. 1 is a schematic structural diagram showing a pixel unit of an array substrate of a display panel in a conventional skill.

Please refer to FIG. 1, which is a schematic structural diagram showing a pixel unit of an array substrate of a display panel in a conventional skill. The array substrate 10 comprises a scan line 11, a data line 12, a pixel electrode 13, and a common line 14. The scan line 11 is disposed on a first metal layer (that is represented by dots in this figure) and is utilized for transmitting a scan signal. The data line 12 is disposed on a second metal layer (that is represented by singular slash lines in this figure) and is utilized for transmitting a data signal. The pixel electrode 13 receives the data signal of the data line 12 according to the scan signal of the scan line 11. The pixel electrode 13 is connected to the data line 12 and the scan line 11 corresponding thereto via a thin-film transistor 15. The common line 14 is disposed on the first metal layer and is utilized for proving a common signal for the pixel electrode 13. The second metal layer is positioned above the first metal layer. That is, in the process of manufacturing the array substrate 10, the first metal layer is fabricated and the second metal layer is then fabricated above the first metal layer.

The touch-controlled display panel of the present invention is an improvement of an array substrate of a conventional display panel. The present invention integrates a common line of a display panel with a touch-controlled driving line and a touch-controlled sensing line of a touch-controlled display panel, thereby improving the efficiency in manufacturing the touch-controlled display panel and reducing the manufacture cost for the touch-controlled display panel.

Figure 2:
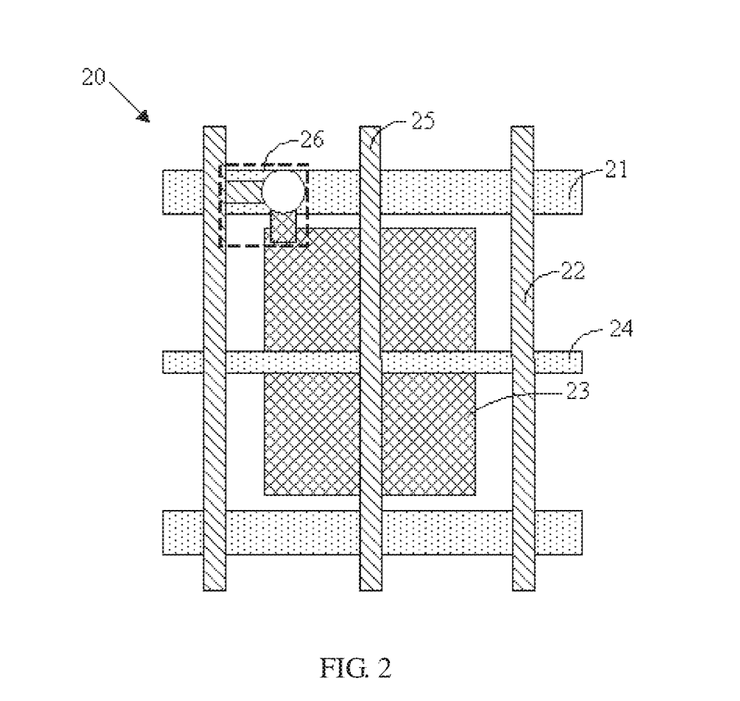
FIG. 2 is a schematic structural diagram showing a pixel unit of an array substrate in accordance with a first preferred embodiment of a touch-controlled display panel of the present invention.
Figure 3:
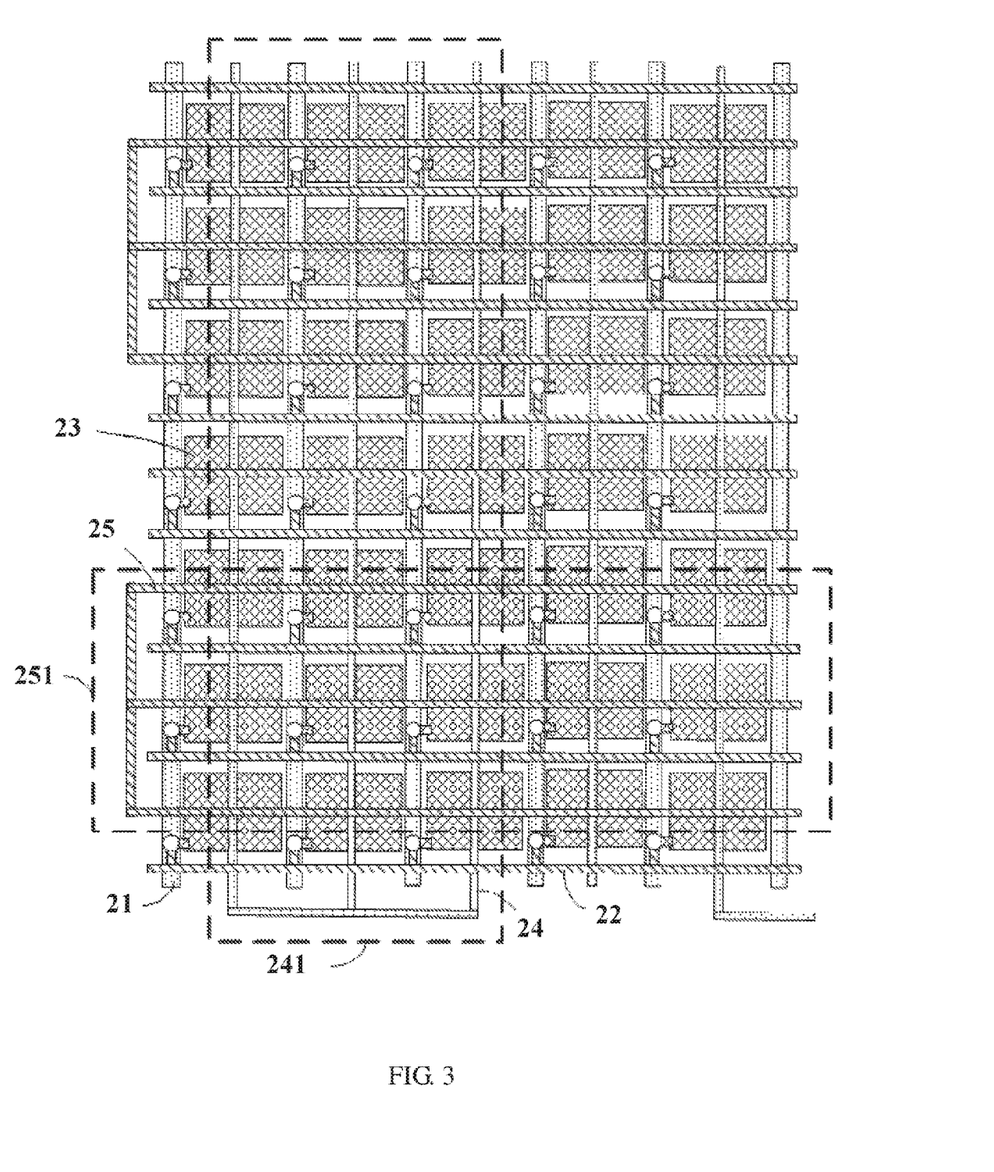
FIG. 3 is a schematic structural diagram showing an array substrate in accordance with a first preferred embodiment of a touch-controlled display panel of the present invention.

Specifically, referring to FIG. 2 and FIG. 3, FIG. 2 is a schematic structural diagram showing a pixel unit of an array substrate in accordance with a first preferred embodiment of a touch-controlled display panel of the present invention, and FIG. 3 is a schematic structural diagram showing an array substrate in accordance with a first preferred embodiment of a touch-controlled display panel of the present invention. The touch-controlled display panel of the present preferred embodiment comprises an array substrate, a color filter substrate, and a liquid crystal layer disposed between the array substrate and the color filter substrate. The array substrate 20 comprises a scan line 21, a data line 22, a pixel electrode 23, a first touch-controlled driving line 24, and a touch-controlled sensing line 25. The scan line 21 is disposed on a first metal layer and is utilized for transmitting a scan signal. The data line 22 is disposed on a second metal layer and is utilized for transmitting a data signal. The pixel electrode 23 receives the data signal of the data line 22 according to the scan signal of the scan line 21. The pixel electrode 23 is connected to the data line 22 and the scan line 21 corresponding thereto via a thin-film transistor 26. The first touch-controlled driving line 24 is disposed on the first metal layer and is parallel to the scan line 21. The first touch-controlled driving line 24 is utilized for providing a common signal for the pixel electrode 23 and a touch-controlled driving signal. The touch-controlled sensing line 25 is disposed on the second metal layer and is parallel to the data line 22. The touch-controlled sensing line 25 is utilized for receiving the common signal for the pixel electrode 23 and a touch-controlled sensing signal.

Preferably, at least one first touch-controlled driving line 24 forms a first touch-controlled driving region 241 and at least one touch-controlled sensing line 25 forms a touch-controlled sensing region 251. In FIG. 3, three adjacent first touch-controlled driving lines 24 form one first touch-controlled driving region 241 and three adjacent touch-controlled sensing lines 25 form one touch-controlled sensing region 251. The lengthwise direction of the first touch-controlled driving region 241 is perpendicular to that of the touch-controlled sensing region 251. Of course, there can be formed a plurality of first touch-controlled driving regions 241 and a plurality of touch-controlled sensing regions 251. The number of the first touch-controlled driving lines forming an individual first touch-controlled driving region 241 may be determined according to user's demand. Likewise, the number of the touch-controlled sensing lines 25 forming an individual touch-controlled sensing region 251 may be determined according to user's demand.

When the touch-controlled display panel of the present preferred embodiment acts as a display panel, the pixel electrode 23 receives the data signal of the data line 22 according to the scan signal of the scan line 21 for displaying an image. Meanwhile, the first touch-controlled driving line 24 parallel to the scan line 21 provides the common signal for the pixel electrode 23 and the touch-controlled sensing line 25 parallel to the data line 22 also provides the common signal for the pixel electrode 23. That is, the first touch-controlled driving line 24 and the touch-controlled sensing line 25 serves as common lines of the touch-controlled display panel. This facilitates providing a storage capacitor and fixing a dark spot for the pixel electrode 23, and also shading an improperly-oriented liquid crystal area of the touch-controlled display panel. The usage of the touch-controlled display panel operated in this mode is in accordance with a conventional display panel.

When the touch-controlled display panel of the present preferred embodiment acts as a touch-controlled panel, the pixel electrode 23 still receives the data signal of the data line 22 according to the scan signal of the scan line 21 for displaying an image. However, the first touch-controlled driving line 24 parallel to the scan line 21 provides the touch-controlled driving signal and the touch-controlled sensing line 25 parallel to the data line 22 provides the touch-controlled sensing signal. That is, the first touch-controlled driving region 241 formed by the first touch-controlled driving line 24 outputs the touch-controlled driving signal so as to output a touch-controlled picture on a screen, and the touch-controlled sensing region 251 formed by the touch-controlled sensing line 25 outputs the touch-controlled sensing signal so as to receive a touch-controlled signal induced by a user. It is noted that the user may all focus on touch operations when the touch-controlled display panel is operated as a touch-controlled panel. Accordingly, the user barely feels the effect of the common lines on the display quality of the panel. Consequently, the touch-controlled display panel of the present preferred embodiment can efficiently use the common lines of the display panel to carry out the transmission of the touch-controlled driving lines and the touch-controlled sensing lines.

Since the touch-controlled display panel of the present preferred embodiment integrates the common lines with the touch-controlled driving line and the touch-controlled sensing line, there is no need to deploy some unique touch-controlled driving lines and touch-controlled sensing lines. A touch-controlled driving function and a touch-controlled sensing function for the common lines can be carried out as long as a peripheral driving circuit for the common lines is improved. Accordingly, it is not necessary to design a unique photomask. Consequently, the in-cell touch display panel of the present preferred embodiment has a higher manufacture efficiency and a lower manufacture cost.

Figure 4:
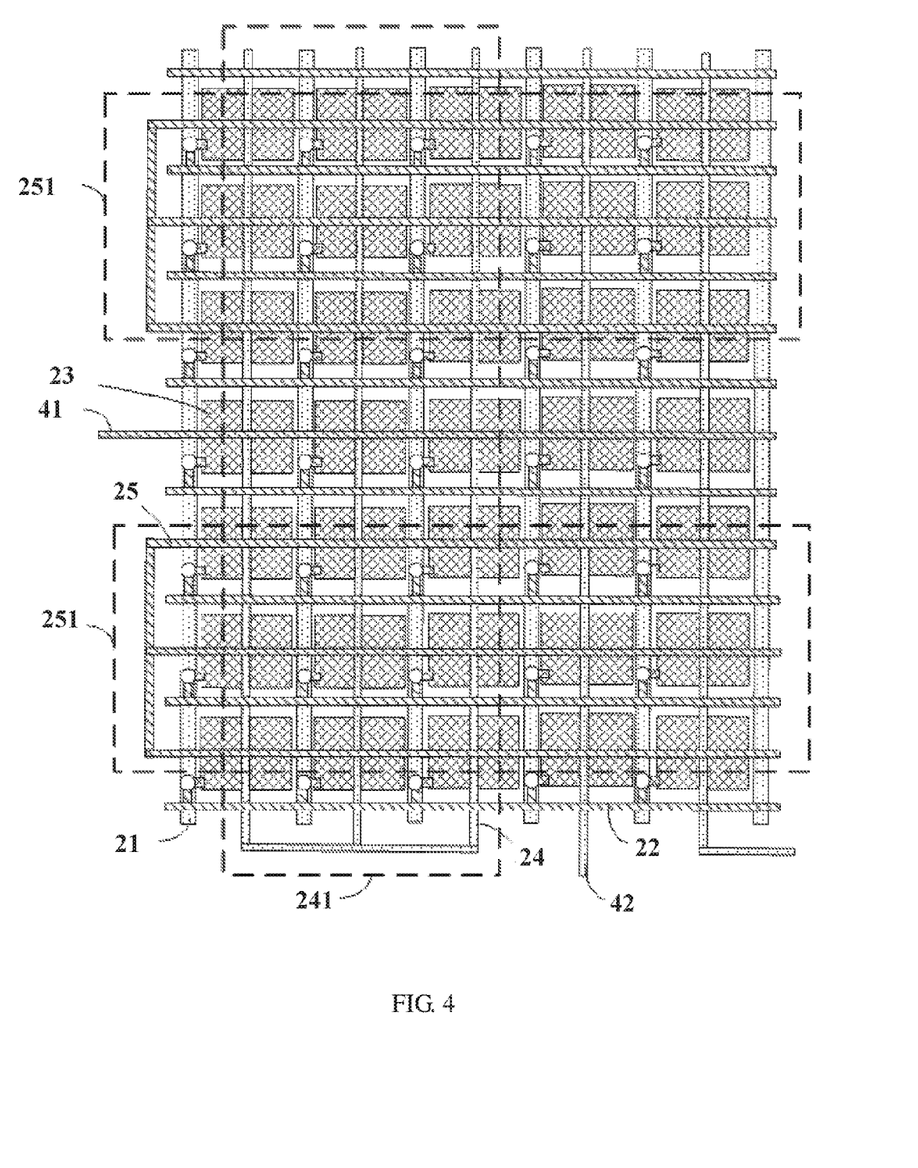
FIG. 4 is a schematic structural diagram showing an array substrate in accordance with a second preferred embodiment of a touch-controlled display panel of the present invention.

Please refer to FIG. 4, which is a schematic structural diagram showing an array substrate in accordance with a second preferred embodiment of a touch-controlled display panel of the present invention. On the basis of the first preferred embodiment, the array substrate of the touch-controlled display panel of the present preferred embodiment further comprises a first ground line 41 and a second ground line 42. The first ground line 41 is disposed on the second metal layer and is parallel to the data line 22. The first ground line 41 is utilized for providing the common signal for the pixel electrode 23 and a ground signal. The second ground line 42 is disposed on the first metal layer and is parallel to the scan line 21. The second ground line 42 is utilized for providing the common signal for the pixel electrode 23 and the ground signal. The first ground line 41 is disposed between any two adjacent touch-controlled sensing regions 251 and the second ground line 42 is disposed between any two adjacent first touch-controlled driving regions 241.

The usage of the touch-controlled display panel of the present preferred embodiment is the same as the afore-described touch-controlled display panel of the first preferred embodiment. Nevertheless, when the touch-controlled display panel of the present preferred embodiment acts as a touch-controlled panel, the interference between the touch-controlled sensing signals of adjacent touch-controlled sensing regions 251 can be further avoided since there is a first ground line 41 disposed between any two adjacent touch-controlled sensing regions 251 (the first ground line 41 serves as a common line when the touch-controlled display panel acts as a display panel). Meanwhile, the interference between the touch-controlled driving signals of adjacent first touch-controlled driving regions 241 can be further avoided since there is a second ground line 42 disposed between any two first touch-controlled driving regions 241 (the second ground line 42 also serves as a common line when the touch-controlled display panel acts as a display panel).

Based on the first preferred embodiment, the touch-controlled display panel of the present preferred embodiment further has the first ground line and the second ground line disposed thereon. This further avoids the interference between different touch-controlled sensing regions or different first touch-controlled driving regions.

Figure 5:
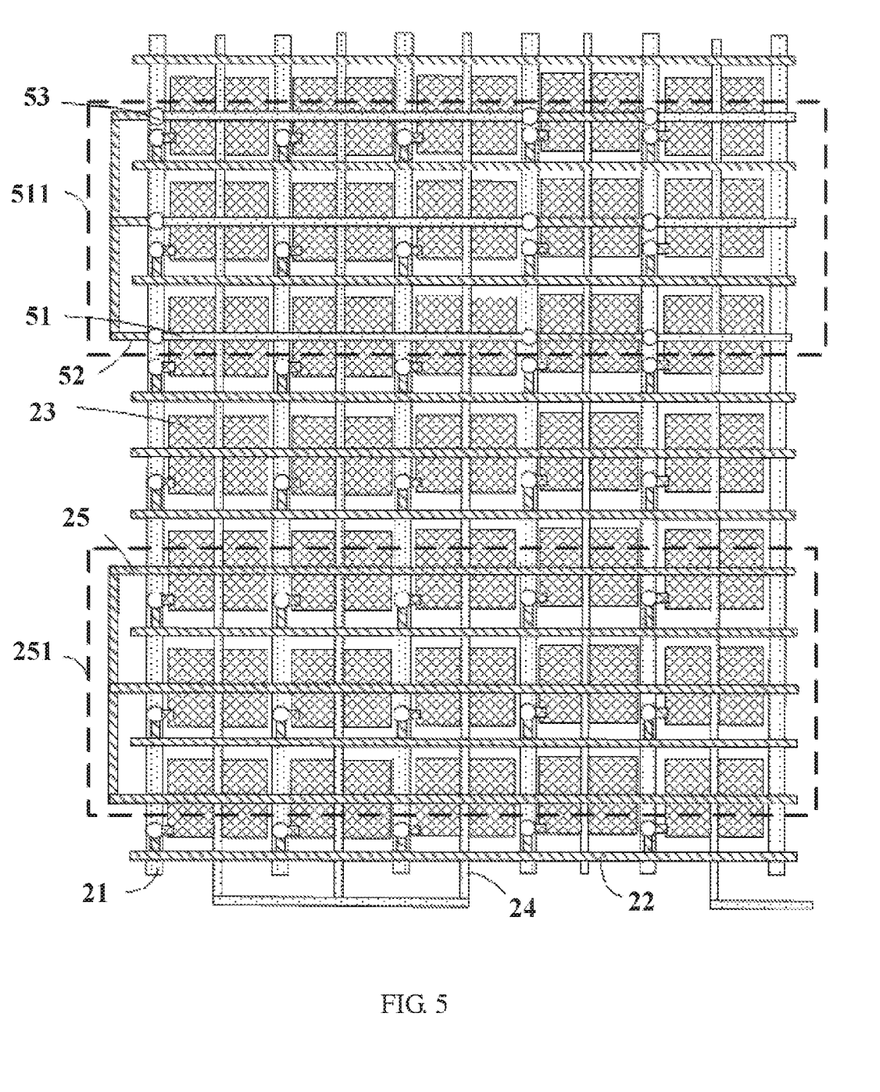
FIG. 5 is a schematic structural diagram showing an array substrate in accordance with a third preferred embodiment of a touch-controlled display panel of the present invention.

Please refer to FIG. 5, which is a schematic structural diagram showing an array substrate in accordance with a third preferred embodiment of a touch-controlled display panel of the present invention. On the basis of the first preferred embodiment, the array substrate of the touch-controlled display panel of the present preferred embodiment further comprises a second touch-controlled driving line 51 and a third touch-controlled driving line 52. The second touch-controlled driving line 51 is disposed on the first metal layer and is parallel to the data line 22. The second touch-controlled driving line 51 is utilized for providing the common signal for the pixel electrode 23 and the touch-controlled driving signal. The second touch-controlled driving line 51 is directly connected to the first touch-controlled driving line 24 corresponding thereto. The third touch-controlled driving line 52 is disposed on the second metal layer and is parallel to the data line 22. The third touch-controlled driving line 52 is utilized for receiving the common signal for the pixel electrode 23 and the touch-controlled sensing signal. The third touch-controlled driving line 52 is connected to the second touch-controlled driving line 51 corresponding thereto. The third touch-controlled driving line 52 is connected to the corresponding second touch-controlled driving line 51 located on the first metal layer, via a contact hole 53, and the second touch-controlled driving line 51 and the third touch-controlled driving line 52 have a one-to-one correspondence.

Preferably, at least one second touch-controlled driving line 51 and the third touch-controlled driving line 52 corresponding thereto form a second touch-controlled driving region 511, and at least one touch-controlled sensing line 25 forms a touch-controlled sensing region 251. In FIG. 5, three adjacent second touch-controlled driving lines 51 and the third touch-controlled driving line 52 corresponding thereto form one second touch-controlled driving region 511, and three adjacent touch-controlled sensing lines 25 form one touch-controlled sensing region 251. The lengthwise direction of the second touch-controlled driving region 511 is parallel to that of the touch-controlled sensing region 251. The second touch-controlled driving region 511 and the touch-controlled sensing region 251 are arranged at intervals or spaced apart. Of course, there can be formed a plurality of second touch-controlled driving regions 511 and a plurality of touch-controlled sensing regions 251. The number of the second touch-controlled driving lines 51 and the third touch-controlled driving lines 52 forming an individual second touch-controlled driving region 511 may be determined according to user's demand. Likewise, the number of the touch-controlled sensing lines 25 forming an individual touch-controlled sensing region 251 may be determined according to user's demand.

The usage of the touch-controlled display panel of the present preferred embodiment is the same as the afore-described touch-controlled display panel of the first preferred embodiment. Nevertheless, the array substrate of the touch-controlled display panel of the present preferred embodiment has both of the second touch-controlled driving region 511 and the touch-controlled sensing region 251 disposed on the second metal layer thereof, and the second touch-controlled driving region 511 and the touch-controlled sensing region 251 are arranged at intervals or spaced apart. Since the second metal layer is disposed above the first metal layer, deploying the second touch-controlled driving region 511 on the second metal layer can improve stability of the output of the touch-controlled driving signal. In such a manner, the touch-controlled sensing signal of the touch-controlled sensing region 251 does not interfere with the output of the touch-controlled driving signal.

Since the common lines located between the data lines 22 generally are all disposed on the second metal layer and the common lines located between the scan lines 21 generally are all disposed on the first metal layer, the touch-controlled driving signal and the touch-controlled sensing signal should be carried on respectively via the first metal layer and the second metal layer for the sake of convenience in operation. However, in the present preferred embodiment, the third touch-controlled driving line 52 outputting the touch-controlled driving signal is disposed on the second metal layer. Accordingly, there is a need to use a contact hole 53 located between the first metal layer and the second metal layer to transmit the touch-controlled driving signal from the first metal layer to the second metal layer. The arrangement of the second touch-controlled driving region 511 thus can be achieved by using the second touch-controlled driving line 51 on the first metal layer to change the direction of the first touch-controlled driving line 24 from "parallel to the scan line 21" to "perpendicular to the scan line 21 (i.e., parallel to the data line 22)", and then by connecting the second touch-controlled driving line 51 to the third touch-controlled driving line 52 on the second metal layer via the contact hole 53.

Based on the first preferred embodiment, the touch-controlled display panel of the preset preferred embodiment further improves stability of the output of the touch-controlled driving signal by deploying the second touch-controlled driving region, and in such a manner, the touch-controlled sensing signal and the touch-controlled driving signal do not interfere with each other.

Figure 6:
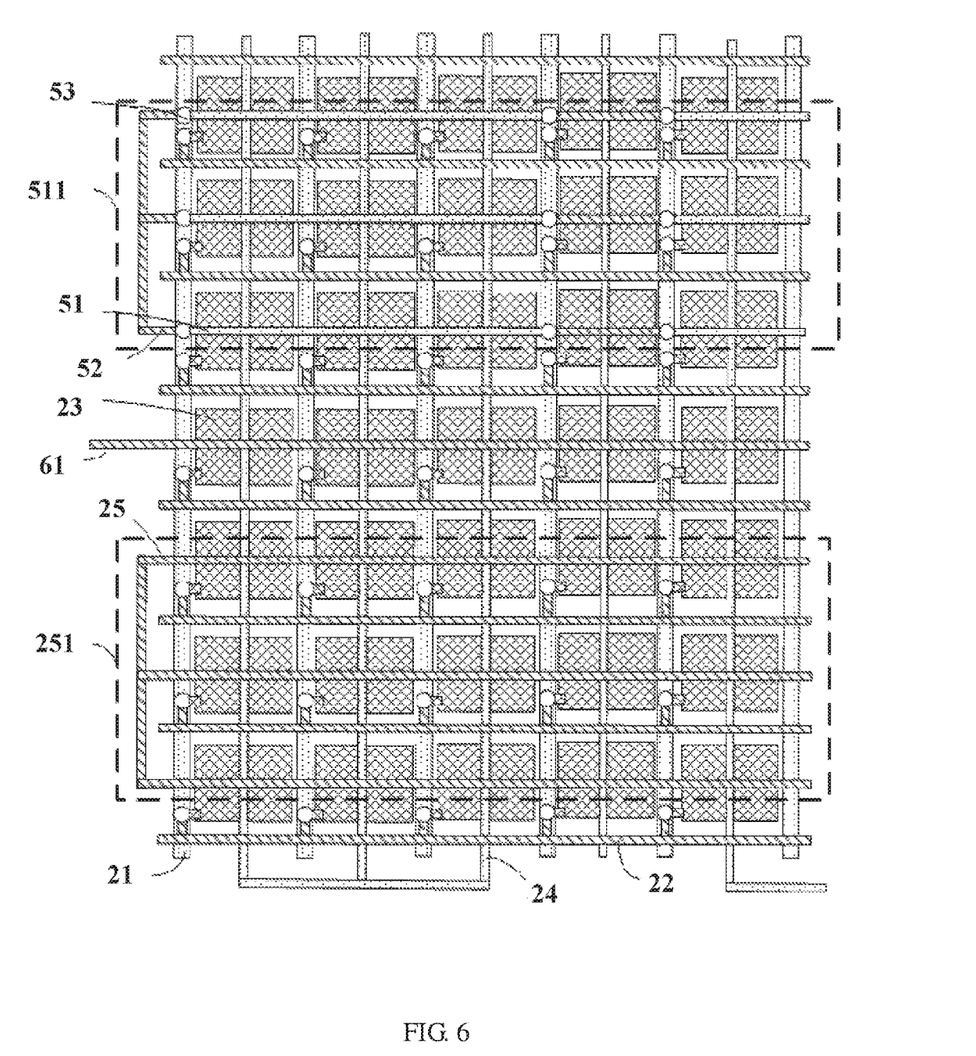
FIG. 6 is a schematic structural diagram showing an array substrate in accordance with a forth preferred embodiment of a touch-controlled display panel of the present invention.

Please refer to FIG. 6, which is a schematic structural diagram showing an array substrate in accordance with a forth preferred embodiment of a touch-controlled display panel of the present invention. On the basis of the third preferred embodiment, the array substrate of the touch-controlled display panel of the present preferred embodiment further comprises a first ground line 61. The first ground line 61 is disposed on the second metal layer and is parallel to the data line 22. The first ground line 61 is utilized for providing the common signal for the pixel electrode 23 and a ground signal. The first ground line 61 is disposed between the touch-controlled sensing region 251 and the second touch-controlled driving region 511 adjacent thereto.

The usage of the touch-controlled display panel of the present preferred embodiment is the same as the afore-described touch-controlled display panel of the third preferred embodiment. Nevertheless, when the touch-controlled display panel of the present preferred embodiment acts as a touch-controlled panel, the interference between the touch-controlled driving signal of the touch-controlled sensing region 251 and the touch-controlled sensing signal of the second touch-controlled driving region can be further avoided since there is a first ground line 61 disposed between the touch-controlled sensing region 251 and the second touch-controlled driving region 511 adjacent thereto (the first ground line 61 serves as a common line when the touch-controlled display panel acts as a display panel).

Based on the third preferred embodiment, the touch-controlled display panel of the present preferred embodiment further has the first ground line disposed thereon. This further avoids the interference between the touch-controlled sensing region and the second touch-controlled driving region adjacent thereto.

The present invention further provides a touch-controlled display device, which uses the afore-described touch-controlled display panel to proceed a display operation and a touch-controlled operation. The usage of the touch-controlled display device of the present invention is the same as the afore-described touch-controlled display panel of the preferred embodiment, and therefore it is suggested to refer the above descriptions concerning the touch-controlled display panel of the preferred embodiment.

The touch-controlled display panel and the touch-controlled display device of the present invention integrate the common line with the touch-controlled driving line and the touch-controlled sensing line, thereby improving the efficiency in manufacturing the touch-controlled display panel and reducing the manufacture cost for the touch-controlled display panel. The present invention solves the technical problems of low manufacture efficiency and high manufacture cost, raised in conventional touch-controlled display panels and touch-controlled display devices.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A touch-controlled display panel, which comprises an array substrate, a color filter substrate, and a liquid crystal layer disposed between the array substrate and the color filter substrate, wherein the array substrate comprises:
   a scan line disposed on a first metal layer, for transmitting a scan signal;
   a data line disposed on a second metal layer, for transmitting a data signal;
   a pixel electrode for receiving the data signal of the data line according to the scan signal of the scan line, the pixel electrode being connected to the data line and the scan line corresponding thereto via a thin-film transistor;
   a first touch-controlled driving line disposed on the first metal layer and parallel to the scan line, for providing a common signal for the pixel electrode and a touch-controlled driving signal;
   a touch-controlled sensing line disposed on the second metal layer and parallel to the data line, for receiving the common signal for the pixel electrode and a touch-controlled sensing signal;
   a second touch-controlled driving line disposed on the first metal layer and parallel to the data line, for providing the common signal for the pixel electrode and the touch-controlled driving signal, the second touch-controlled driving line being connected to the first touch-controlled driving line corresponding thereto; and
   a third touch-controlled driving line disposed on the second metal layer and parallel to the data line, for receiving the common signal for the pixel electrode and the touch-controlled sensing signal, the third touch-controlled driving line being connected to the second touch-controlled driving line corresponding thereto;
   wherein the third touch-controlled driving line is connected to the corresponding second touch-controlled driving line located on the first metal layer, via a contact hole, and the second touch-controlled driving line and the third touch-controlled driving line have a one-to-one correspondence.

2. The touch-controlled display panel according to claim 1, wherein at least one first touch-controlled driving line forms a first touch-controlled driving region and at least one touch-controlled sensing line forms a touch-controlled sensing region.

3. The touch-controlled display panel according to claim 2, wherein a lengthwise direction of the first touch-controlled driving region is perpendicular to that of the touch-controlled sensing region.

4. The touch-controlled display panel according to claim 2, wherein the array substrate further comprises:
   a first ground line disposed on the second metal layer and parallel to the data line, for providing the common signal for the pixel electrode and a ground signal; and
   a second ground line disposed on the first metal layer and parallel to the scan line, for providing the common signal for the pixel electrode and the ground signal;
   wherein the first ground line is disposed between any two adjacent touch-controlled sensing regions, and the second ground line is disposed between any two adjacent first touch-controlled driving regions.

5. The touch-controlled display panel according to claim 2, wherein at least one second touch-controlled driving line and the third touch-controlled driving line corresponding thereto form a second touch-controlled driving region, and at least one touch-controlled sensing line forms a touch-controlled sensing region.

6. The touch-controlled display panel according to claim 5, wherein a lengthwise direction of the second touch-controlled driving region is parallel to that of the touch-controlled sensing region.

7. The touch-controlled display panel according to claim 5, wherein the second touch-controlled driving region and the touch-controlled sensing region are arranged at intervals.

8. The touch-controlled display panel according to claim 5, wherein the array substrate further comprises:
   a first ground line disposed on the second metal layer and parallel to the data line, for providing the common signal for the pixel electrode and a ground signal;
   wherein the first ground line is disposed between the touch-controlled sensing region and the second touch-controlled driving region adjacent thereto.

9. A touch-controlled display device, comprising:
   a backlight source; and
   a touch-controlled display panel comprising an array substrate, a color filter substrate, and a liquid crystal layer disposed between the array substrate and the color filter substrate;
   wherein the array substrate comprises:
   a scan line disposed on a first metal layer, for transmitting a scan signal;
   a data line disposed on a second metal layer, for transmitting a data signal;
   a pixel electrode for receiving the data signal of the data line according to the scan signal of the scan line, the pixel electrode being connected to the data line and the scan line corresponding thereto via a thin-film transistor;
   a first touch-controlled driving line disposed on the first metal layer and parallel to the scan line, for providing a common signal for the pixel electrode and a touch-controlled driving signal;
   a touch-controlled sensing line disposed on the second metal layer and parallel to the data line, for receiving the common signal for the pixel electrode and a touch-controlled sensing signal;
   a second touch-controlled driving line disposed on the first metal layer and parallel to the data line, for providing the common signal for the pixel electrode and the touch-controlled driving signal, the second touch-controlled driving line being connected to the first touch-controlled driving line corresponding thereto; and
   a third touch-controlled driving line disposed on the second metal layer and parallel to the data line, for receiving the common signal for the pixel electrode and the touch-controlled sensing signal, the third touch-controlled driving line being connected to the second touch-controlled driving line corresponding thereto;
   wherein the third touch-controlled driving line is connected to the corresponding second touch-controlled driving line located on the first metal layer, via a contact hole, and the second touch-controlled driving line and the third touch-controlled driving line have a one-to-one correspondence.

10. The touch-controlled display device according to claim 9, wherein at least one first touch-controlled driving line forms a first touch-controlled driving region and at least one touch-controlled sensing line forms a touch-controlled sensing region.

11. The touch-controlled display device according to claim 10, wherein a lengthwise direction of the first touch-controlled driving region is perpendicular to that of the touch-controlled sensing region.

12. The touch-controlled display device according to claim 10, wherein the array substrate further comprises:
   a first ground line disposed on the second metal layer and parallel to the data line, for providing the common signal for the pixel electrode and a ground signal; and
   a second ground line disposed on the first metal layer and parallel to the scan line, for providing the common signal for the pixel electrode and the ground signal;
   wherein the first ground line is disposed between any two adjacent touch-controlled sensing regions, and the second ground line is disposed between any two adjacent first touch-controlled driving regions.

13. The touch-controlled display device according to claim 10, wherein at least one second touch-controlled driving line and the third touch-controlled driving line corresponding thereto form a second touch-controlled driving region, and at least one touch-controlled sensing line forms a touch-controlled sensing region.

14. The touch-controlled display device according to claim 13, wherein a lengthwise direction of the second touch-controlled driving region is parallel to that of the touch-controlled sensing region.

15. The touch-controlled display device according to claim 13, wherein the second touch-controlled driving region and the touch-controlled sensing region are arranged at intervals.

16. The touch-controlled display device according to claim 13, wherein the array substrate further comprises:
   a first ground line disposed on the second metal layer and parallel to the data line, for providing the common signal for the pixel electrode and a ground signal;
   wherein the first ground line is disposed between the touch-controlled sensing region and the second touch-controlled driving region adjacent thereto.

* * * * *